United States Patent
Cianciotto et al.

(10) Patent No.: US 7,155,106 B2
(45) Date of Patent: Dec. 26, 2006

(54) HIGH EFFICIENCY MULTI-SPECTRAL OPTICAL SPLITTER

(75) Inventors: Frank Cianciotto, Queen Creek, AZ (US); George Butler, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 71 days.

(21) Appl. No.: 10/857,073

(22) Filed: May 28, 2004

(65) Prior Publication Data

US 2005/0265683 A1    Dec. 1, 2005

(51) Int. Cl.
G02B 6/10     (2006.01)

(52) U.S. Cl. ...................................... 385/146; 385/147

(58) Field of Classification Search ................ 385/146, 385/147
See application file for complete search history.

(56) References Cited

U.S. PATENT DOCUMENTS

| | | | |
|---|---|---|---|
| 4,632,513 | A | 12/1986 | Stowe et al. |
| 4,964,692 | A | 10/1990 | Prescott |
| 5,054,874 | A | 10/1991 | Hill et al. |
| 5,375,185 | A | 12/1994 | Hermsen et al. |
| 5,553,183 | A | 9/1996 | Bechamps |
| 5,604,837 | A | 2/1997 | Tanaka |
| 5,701,191 | A | 12/1997 | Iwasaki |
| 5,828,505 | A | 10/1998 | Farmiga |
| 6,038,361 | A | 3/2000 | Yoshikawa et al. |
| 6,104,857 | A | 8/2000 | Ishiharada et al. |
| 6,112,004 | A * | 8/2000 | Colvin ........................ 385/116 |
| 6,149,289 | A | 11/2000 | Kuramitsu et al. |
| 6,324,330 | B1 | 11/2001 | Stites |
| 6,332,688 | B1 | 12/2001 | Magarill |
| 6,366,308 | B1 | 4/2002 | Hawryluk et al. |
| 6,595,673 | B1 * | 7/2003 | Ferrante et al. ............. 362/551 |
| 6,771,870 | B1 | 8/2004 | Strobl et al. |
| 6,792,190 | B1 | 9/2004 | Xin et al. |
| 6,801,701 | B1 | 10/2004 | Montgomery et al. |
| 6,857,764 | B1 | 2/2005 | Kohno |
| 2001/0005222 | A1 | 6/2001 | Yamaguchi |
| 2004/0137089 | A1 | 7/2004 | Dinan |
| 2004/0137189 | A1 | 7/2004 | Tellini et al. |

(Continued)

FOREIGN PATENT DOCUMENTS

JP     11-017969     1/1999

(Continued)

OTHER PUBLICATIONS

U.S. Appl. No. 11/122,205, Cianciotto.

(Continued)

*Primary Examiner*—Jennifer Doan
(74) *Attorney, Agent, or Firm*—Harness Dickey & Pierce P.L.C.

(57) ABSTRACT

An optical wave guide. The guide includes a body with a cross section that defines a polygon, preferably a hexagon. The proximal end of the body optically couples to an optical source (e.g. an optical fiber or light source) with an initial distribution. The wave travels through the body to the distal end whereby the distribution becomes a top hat distribution. In another preferred embodiment a bundle of optical fibers is coupled to the distal end. Additionally, the guide may include a coupler to align the source and the bundle with the body. In yet another preferred embodiment, the length of the body is at least about 6 times the width of the cross section. In another preferred embodiment, a method of splitting a wave is provided. The method includes passing an electromagnetic wave through a wave guide with a hexagonal cross section.

19 Claims, 6 Drawing Sheets

U.S. PATENT DOCUMENTS

2005/0084210 A1  4/2005  Cha
2005/0135766 A1  6/2005  Cianciotto
2005/0162853 A1  7/2005  Jain

FOREIGN PATENT DOCUMENTS

JP        11-250227    9/1999

OTHER PUBLICATIONS

U.S. Appl. No. 11/180,285, Cianciotto.
U.S. Appl. No. 11/199,826, Cianciotto.
U.S. Appl. No. 11/154,079, Cianciotto.
U.S. Appl. No. 11/126,974, Cianciotto.
U.S. Appl. No. 11/371,878, Cianciotto.

* cited by examiner

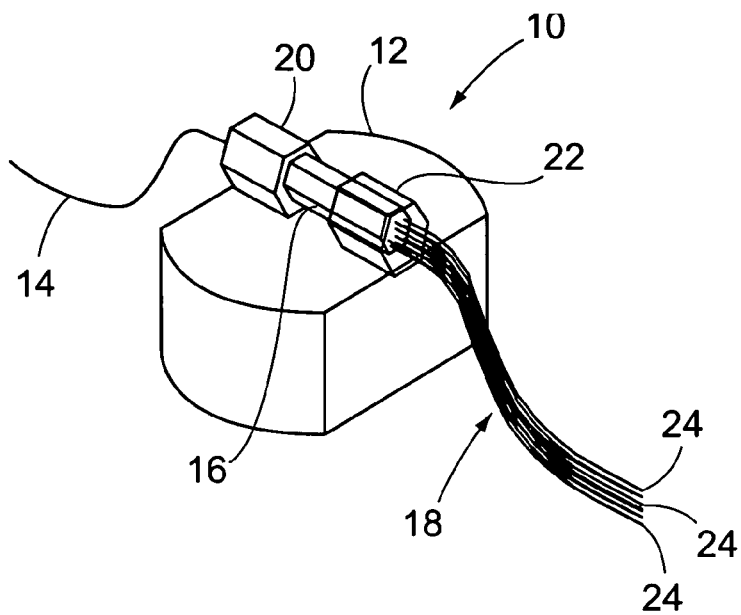
Figure 1A
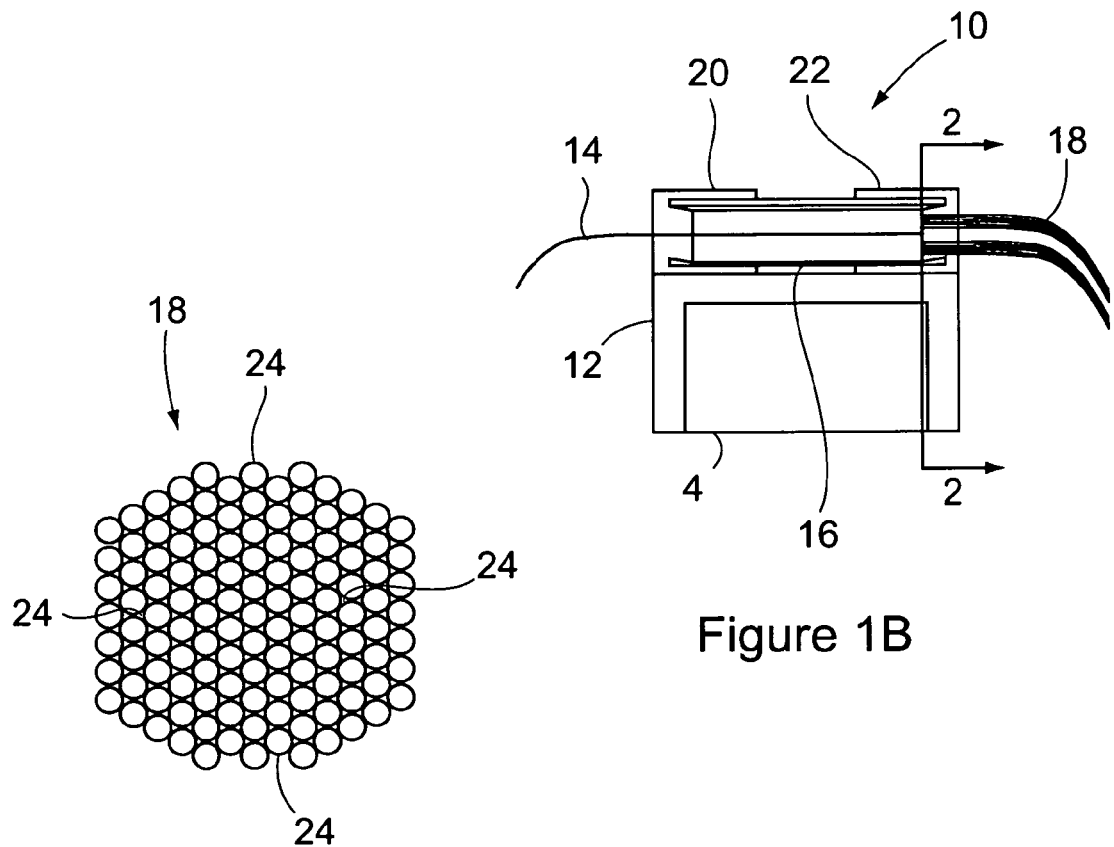
Figure 1B
Figure 2

HIGH EFFICIENCY MULTI-SPECTRAL OPTICAL SPLITTER

FIELD OF THE INVENTION

This invention relates generally to optical splitters and, more particularly, to optical splitters having the capability to split a single light source into a plurality of portions having approximately equal intensity.

BACKGROUND OF THE INVENTION

A need exists in both fiber optic telecommunications and fiber optic illumination systems to split light (i.e. electromagnetic waves) into numerous portions of equal intensity for transmission to different locations. In fiber optic communication systems, such splitting allows a signal to be fanned out to many different receivers. In illumination systems, such splitting allows a single source to illuminate numerous locations spread about the source at various distances and in various directions.

For illumination systems, in particular, the efficiency of the splitter is of importance because light loss associated with the splitter becomes unavailable for the satisfaction of the illumination demands. Further, because many illumination systems must light hundreds, or even thousands, of individual locations (e.g. reading and interior marking lights of an aircraft), the splitters must be inexpensive to manufacture. Likewise, because of the number of splitters required to build these illumination systems, the optical coupling of the light source, and the output fibers, to the splitter must be easy to accomplish and tolerant of mechanical misalignments.

Thus, a need exists for a low-cost, rugged device that efficiently splits a single light source into numerous portions, each portion having approximately an equal intensity.

SUMMARY OF THE INVENTION

It is in view of the above problems that the present invention was developed. The invention includes optical wave guides, splitters and methods of homogenizing and splitting a single light source into numerous portions.

In a first preferred embodiment, the present invention provides a hexagonal wave guide. The hexagonal guide homogenizes a light wave that has an initial, non-uniform profile (i.e. an intensity distribution) to a wave with a uniform, or "top hat," distribution as will be herein described. The source of the light may be an optical fiber or any other light producing or emitting device. Further, a bundle of optical fibers may be optically coupled to the output of the guide so as to accept the light with the homogenized profile. Since the light coupled into the bundle of fibers has a top hat profile, each fiber receives approximately the same portion of the intensity of the original light wave. Thus, the guide of the present invention may be employed in a fiber optic splitter. A coupler may also be provided to align the light source and the wave guide. The mount may also align the wave guide and the output bundle as well. Thus, mis-alignments of as much as 2 degrees and 10 degrees at the source and the output, respectively, may be tolerated without significant light loss associated with the splitter.

In still another preferred embodiment, the present invention provides a method of splitting light. The method includes creating a light wave having an initial distribution. The method also includes passing the wave through a wave guide with a cross section defining a polygon, the passing being in a direction generally perpendicular to the cross section. The light output from the wave guide may then be coupled to at least one destination.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 1 illustrates an optical splitter constructed in accordance with the principals of the present invention;

FIG. 2 illustrates a cross section of a fiber bundle of the splitter of FIG. 1 as viewed along line 2—2 in FIG. 1;

DETAILED DESCRIPTION OF THE PREFERRED EMBODIMENTS

Figure 3:
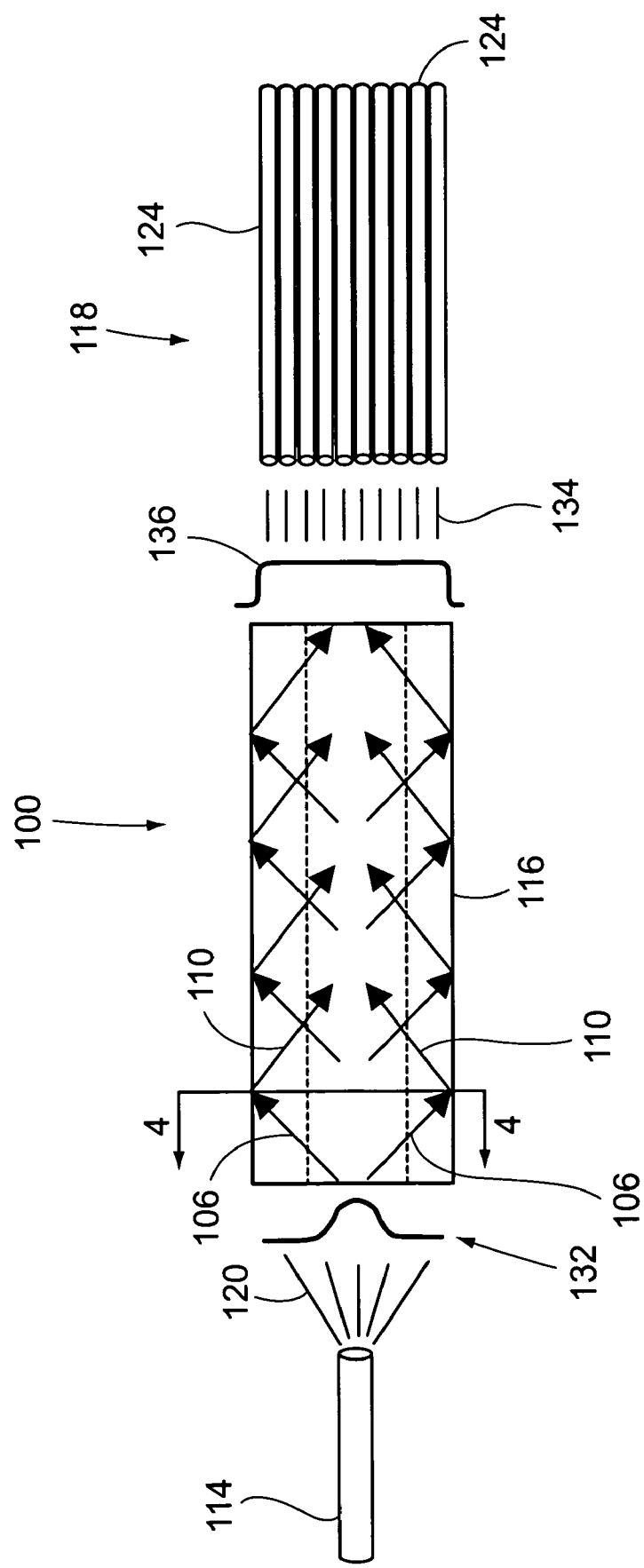
FIG. 3 illustrates another preferred embodiment of a splitter of the present invention.

Referring to the accompanying drawings in which like reference numbers indicate like elements, FIG. 1 illustrates a preferred optical splitter 10 constructed in accordance with the principals of the present invention.

FIG. 1 also illustrates a coupler 12, an optical source 14, a wave guide 16, an output fiber bundle 18, a source bracket 20, and an output bundle bracket 22 of the splitter 10. The coupler 12 includes the brackets 20 and 22 that align the source 14 and the output fiber bundle 18 with the guide 16. As shown, the guide 16 has a cross section that defines a polygon (e.g. a hexagon). FIG. 2 illustrates the output fiber bundle 18 of FIG. 1 as seen along the line 2—2. As shown, the output bundle 18 may have a cross section generally corresponding to that of the guide 16. Further, the output bundle 18 includes a plurality of fibers 24 packed together to approximate the hexagonal cross section of the guide 16. The spacing between the individual fibers 24 is also preferably minimized.

The end caps 20 and 22 fit over the ends of the wave guide 16. Additionally, the source end cap 20 securely holds the source fiber 14 in fixed relation to the proximal end of the wave guide 16. Likewise, the output end cap 22 securely holds the output fiber bundle 18 in fixed relationship to the distal end of the waveguide 16. Further, the ends of the wave guide 16, the source fiber 14, and the individual fibers 24 of the fiber bundle 18 may be prepared, in a manner well known in the art, to have light optically coupled therewith. Thus, when held in fixed relationship to the wave guide 16, the source fiber 14 and the output fibers 24 are optically coupled to the wave guide 16.

In operation, the splitter 10 is used to split one light source 20 into numerous, equally intense portions for subsequent routing to various destinations via the fibers 24. In a preferred embodiment, the fibers 24 are routed to individual reading lights onboard a mobile platform such as an aircraft.

In another preferred embodiment, the fibers 24 are routed to fiber optic sensors used for measuring a wide variety of conditions (e.g. temperature, pressure, vibration, and strain). In yet another embodiment, the fibers 24 are routed to optical receivers and are used to fan out data from the source 20 to the receivers.

FIG. 3 illustrates another optical splitter 100 in accordance with a preferred embodiment of the present invention. Generally, FIG. 3 shows light (for example visible, infrared, or ultraviolet light) being split by the splitter 100. The initial light wave 120 emanates from the source 114 with a generally Gaussian intensity distribution 132. The initial light 120 couples into the hex guide 116, is transmitted therethrough (as light rays 106 and reflected light rays 110), and emerges as a light wave 134 having a generally equal intensity distribution 136. The distribution 136 resembles a sqaure wave with sharp decreases of intensity shown generally adjacent the outer surfaces of the guide 116. Such homogenized intensity distributions 136 are known as "Top Hat" distributions and are highly desired. It has been observed that hex guides 116 having a length/diameter ratio of about at least 6 to 1 produce the "Top Hat" distribution 136 from the initial distribution 134.

Figure 4B:
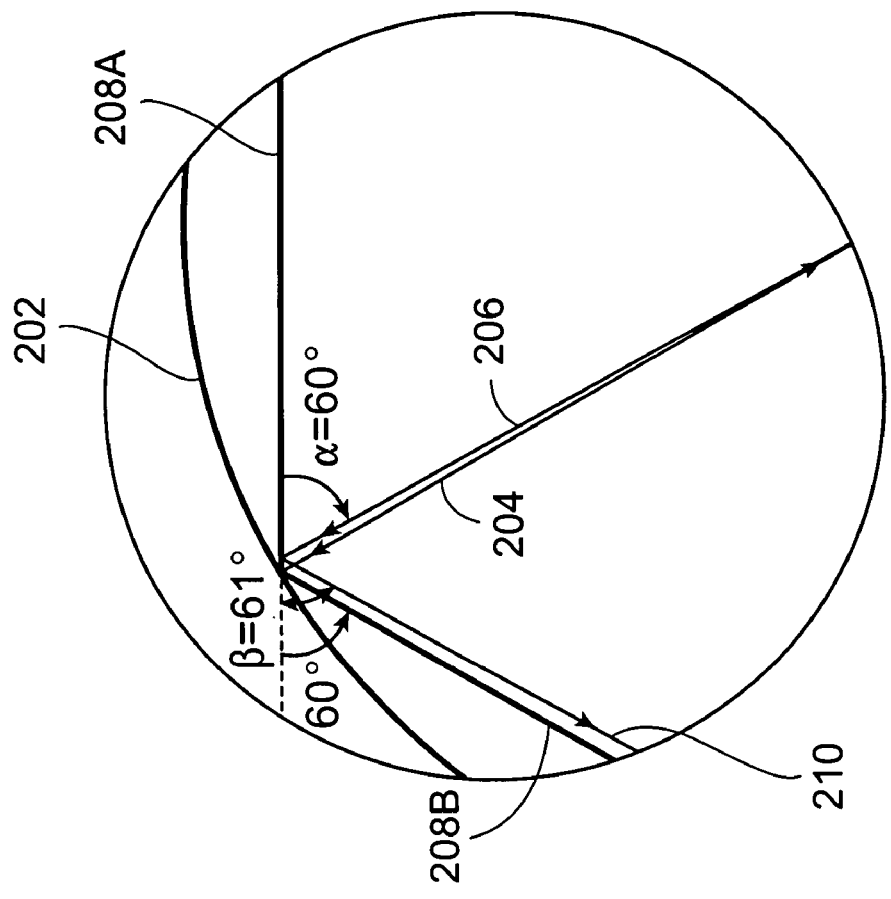
FIG. 4 illustrates a cross section of a wave guide of FIG. 3 as viewed along line 4—4 in FIG. 3.
Figure 4A:
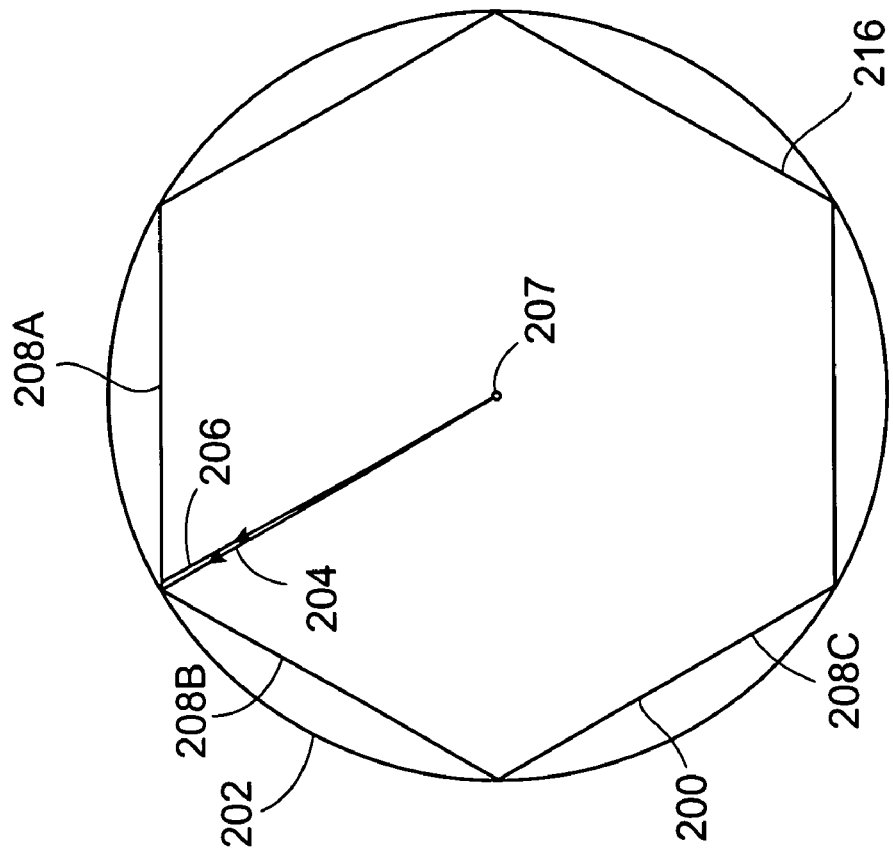

While not wishing to be held to any one theory of operation, it is believed that wave guides constructed in accordance with the present invention operate as illustrated by FIG. 4. FIG. 4 shows a wave guide 200 in cross section taken perpendicularly to a longitudinal axis of the wave guide 200. For reference, the outline of a circular wave guide 202 is also shown. Included in FIG. 4 is a center 207 of the waveguide 200 (and circular wave guide 202). Also shown are two light rays 204 and 206 radiating from a source located along an axis through the center 207. For the circular wave guide 202, all light rays 204 originating at the source (center 207) reflect directly back off of the surface of the waveguide 202. That is, in cross section, it appears that the light ray 204 reflects back and forth across the wave guide 202 with each reflection occurring at the same angular position about the center 207. Because the circular wave guide 202 never alters the reflections, the initial intensity distribution of the light rays 204 remains essentially the same along the length of the circular wave guide 202.

In contrast, the polygon shaped cross section of the wave guide 200 causes a change in the distribution along the length of the wave guide as will be explained with particular reference to FIG. 4B. To begin, the vast majority of the light rays 206 in the wave guide 200 will encounter the surfaces 208 at an acute angle α. For example, light ray 206 is shown encountering the surface 208A at an incident angle α of about 61 degrees. The light ray 210, of course, reflects from the surface 208 at an angle β equal to the incident angle α of 61 degrees. Because the adjacent surface 208B is orientated at an angle of 60 degrees from the orientation of surface 208A, the reflected light ray 210 travels in a direction slightly (by 1 degree) angled away from the surface 208A and therefore slightly toward the center 207. Thus, the light guide 200 alters the distribution of light across the cross section of the guide 200 by directing light that reflects near the intersections of two surfaces 208A and 208B slightly toward the center 207. The effect is most pronounced near the surface intersections and diminishes toward the center of the surfaces 208 because the incident angle of the light approaches 90 degrees near the center of the surfaces 208. Further, as the reflected light ray 210 travels along the length of the wave guide 200, it reflects off of the surface 208C and is again turned slightly toward the center 207. Thus, the profile of the light distribution changes as the light travels along the length of the tube. In particular, it has been observed that the profile assumes a "top hat," or square, distribution after a length of about 6 times the width (measured between diametrically opposed apexes) of the cross section.

Figure 5A:
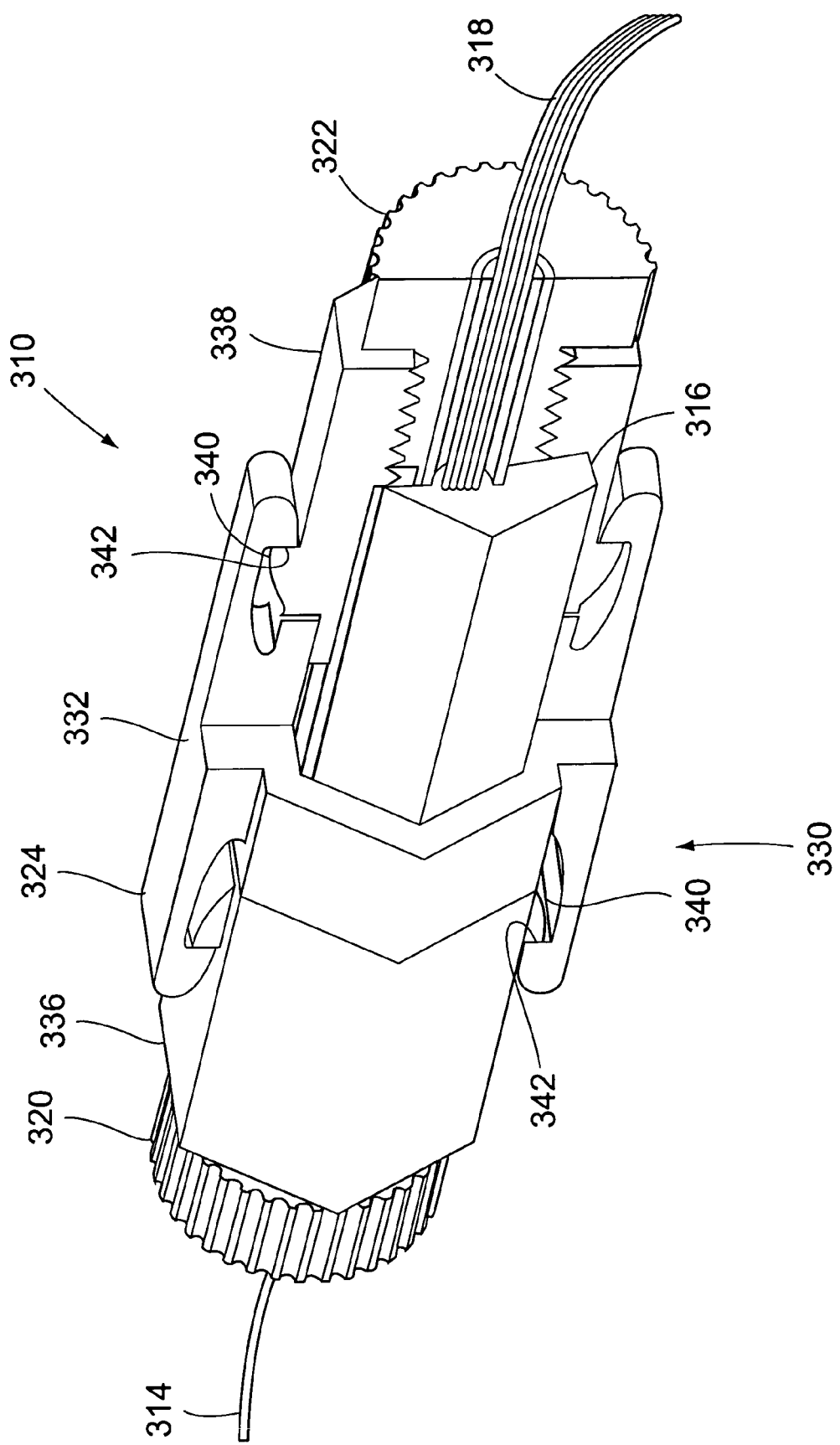
FIG. 5 illustrates yet another preferred embodiment of the present invention.
Figure 5B:
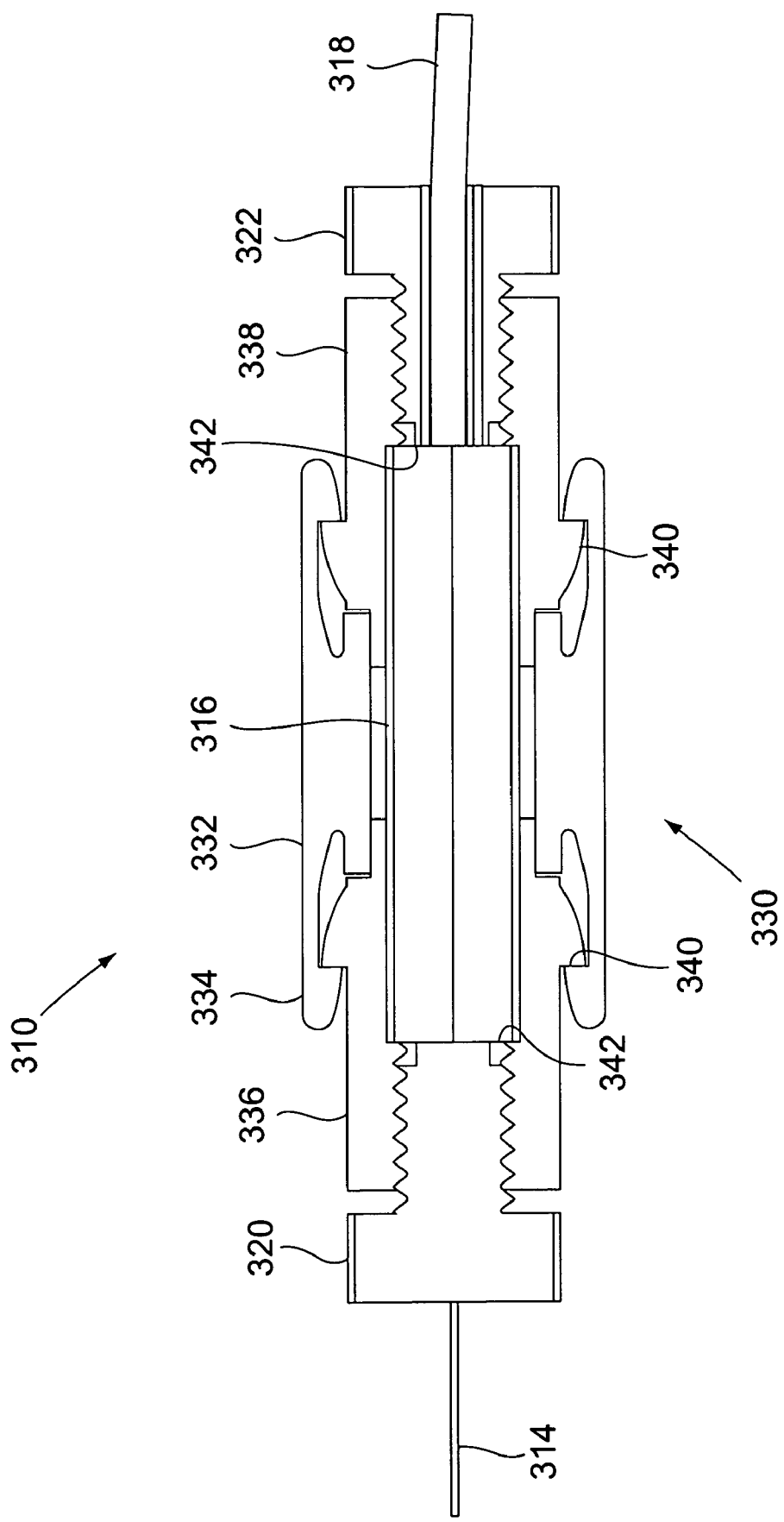
Figure 6:
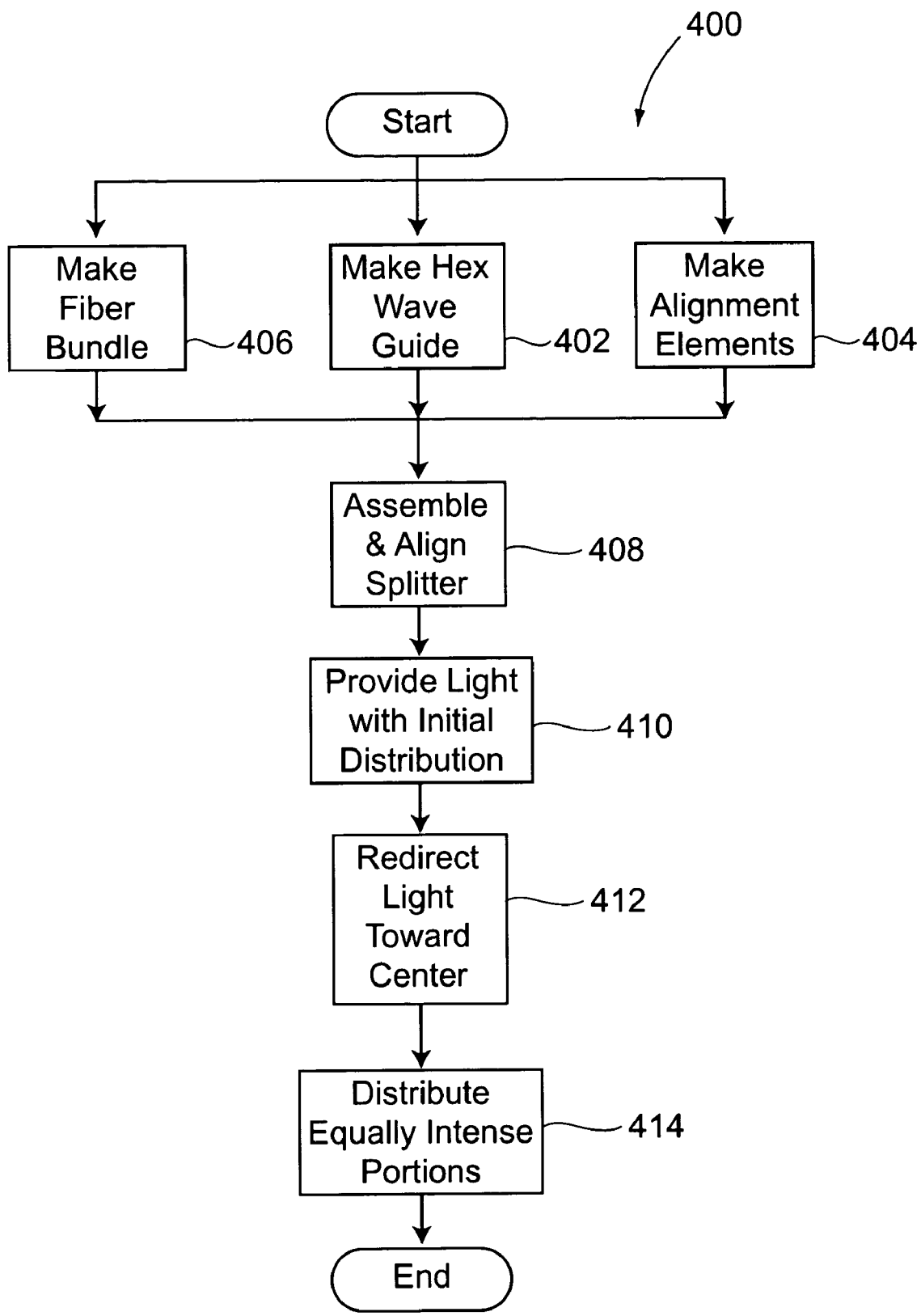
FIG. 6 illustrates a method in accordance with the principals of the present invention.

With reference now to FIG. 5, another preferred embodiment of the present invention is illustrated. One of the primary differences between the previous figures and FIG. 6 is that FIG. 6 illustrates a preferred housing 330 for a wave guide 316. The optical splitter 310 also includes a source fiber 314, an output fiber bundle 318, a source ferrule 320, and an output ferrule 322. The housing 330 includes a main body 332 with resilient members 334, a source bushing 336, and an output bushing 338. Each of the bushings 336 and 338 include shoulders 340 and 342.

To assemble the splitter 310, the main body 332 is slid over the wave guide 316 and approximately centered thereon. The bushings 336 and 338 are then slid over the proximal and distal ends, respectively, of the wave guide 316 until the internal shoulders 342 abut the ends of the wave guide 316. Of course, as the bushings 336 and 338 slide over the wave guide 316, the resilient members 334 flex outward to allow the external shoulders 340 to enter the main body 332 of the housing 330. As the shoulders 340 pass under the resilient members 334, the resilient members 334 return to their original positions, thereby securing the shoulders 340 in the main body 332 as shown. The source fiber 314 may then be inserted in the source ferrule 320 which is then screwed into the source bushing 336. Similarly, the output bundle 318 may then be inserted into the output ferrule 338 which is then screwed into the output bushing 338. As will be appreciated by those skilled in the art, the ferrules 320 and 322, bushings 336 and 338, and the housing 330 are shaped and adapted so that when they are assembled, the source fiber 314 and the output bundle 318 are securely held in place adjacent the ends of the wave guide 316. Thus the source fiber 320 and output fibers (of the bundle 318) are optically coupled to the wave guide 316. Also, as is known in the art, the ends of the wave guide 316 and the fibers 314 and 318 may be polished, or otherwise prepared, to enhance the optical coupling of the fibers to the wave guide 316.

With reference now to FIG. 6, a method in accordance with another preferred embodiment is illustrated. The method 400 includes forming a wave guide in operation 402. Generally, the wave guide can be formed from any transparent stock having an index of refraction suitable for use as an optical wave guide. For instance, the wave guide may be formed from glass, plastic, or other stock that has a cross section defining a polygon, preferably a hexagon. In operation 404, the elements for aligning the optical components of the splitter are created. Preferably, the source end caps may be formed with a hole to accept the source and align it with the wave guide. Similarly, the output end cap may be formed with holes for each of the fibers of the output bundle to accept the fibers and align them with the wave guide. Other portions of the splitter used to align the optical elements may also be formed at this time (e.g. a housing may be formed with a polygon-shaped void for holding the wave guide and having a suitable index of refraction). The fiber bundle may be created in operation 406 by bundling a plurality of individual fibers together with an appropriate holder, clamp, tie wrap, or the like. See operation 406. In the alternative, each fiber of the bundle may be inserted into one of the holes of the output end cap so that the end cap serves to bundle the fibers.

The splitter may then be assembled in operation 408 to yield an assembly with the source and the bundle aligned with the waveguide. The source may then be turned on to produce a light wave with an initial intensity distribution (e.g. Gausian) as in operation 410. The light from the source enters the wave guide and reflects off of the surfaces of the wave guide as it travels the length of the guide. See operation 412. As the light travels along the guide, the distribution is altered by the guide to produce the desired top hat distribution. From the output end of the wave guide, equally intense portions of the light may then be distributed via the fibers of the bundle as in operation 414.

In view of the foregoing, it will be seen that the several advantages of the invention are achieved and attained. A rugged, low-cost, and light-weight, optical splitter, and methods of homogenizing and splitting light waves, have been provided. In particular, optical splitter that are easy to install and tolerant of mechanical mis-alignments between the source and the wave guide have been described. Likewise, the optical splitters described herein tolerate mechanical mis-alignment between the fibers of the bundle and the wave guide. Moreover, a new wave guide that homogenizes an input light wave to produce a top hat distribution has been described.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A wave guide comprising:
   a tubular body with a reflective inner surface defining a hollow interior, the tubular body having a proximal end, a distal end, and a cross section defining a polygon,
   the proximal end adapted to optically couple to an electromagnetic wave with an initial distribution, the reflective interior surface of the hollow tubular body adapted to reflect a portion of the initial distribution toward a center of the tube and allow the wave to travel through the hollow interior of the body from the proximal end to the distal end, and
   the distal end adapted to optically couple the wave therefrom, the wave to substantially have a uniform intensity distribution near the distal end; and
   further comprising a coupler mechanically coupled to the body and adapted to mechanically couple to a source optical fiber generally adjacent the proximal end to thereby optically couple the source optical fiber to the proximal end, the coupler further adapted to mechanically couple to a plurality of optical fibers generally adjacent the distal end to thereby optically couple the plurality of fibers to the distal end.

2. The guide according to claim 1, wherein the cross section further defines a hexagon.

3. The guide according to claim 1, further comprising a plurality of optical fibers optically coupled to the distal end.

4. The guide according to claim 1, further comprising a source optical fiber coupled to the proximal end.

5. The guide according to claim 1, the coupler further comprising defining a plurality of holes, each hole adapted to accept one of the plurality of optical fibers.

6. The guide according to claim 1, wherein the coupler is further adapted to align the source optical fiber and the proximal end within about 2 degrees.

7. The guide according to claim 1, wherein the coupler is further adapted to align the plurality of optical fibers and the distal end within about 10 degrees.

8. The guide according to claim 1, wherein the plurality of optical fibers defines a bundle having a cross section generally corresponding to the cross section of the body.

9. The guide according to claim 1, wherein a length of the body between the proximal and distal ends is at least about 6 times a width of the cross section.

10. An optical wave guide comprising:
    a tubular body with a reflective inner surface defining a hollow interior, the hollow tubular body having a proximal end, a distal end, and a cross section defining a hexagon, the proximal end adapted to optically couple with an electromagnetic wave source for accepting an electromagnetic wave with an initial distribution, the reflective inner surface of the hollow tubular body adapted to allow at least a portion of the electromagnetic wave to be reflected toward a center of the tube and to travel through the hollow interior of the body from the proximal end to the distal end, the distance between the proximal and distal ends being at least about 6 times a width of the cross section;
    a bundle of optical fibers generally adjacent the distal end and defining a bundle cross section generally corresponding to the cross section of the body; and
    a coupler mechanically coupled to the body and adapted to mechanically couple to the source generally adjacent the proximal end to thereby optically couple the source to the proximal end, the coupler defining a plurality of holes, each hole accepting one of the bundle of optical fibers in such a manner that the distal end optically couples approximately a same intensity of the electromagnetic wave to each of the optical fibers of the bundle.

11. A method of splitting a wave, comprising:
    creating an electromagnetic wave having an initial distribution;
    providing a wave guide comprising a tube with opposite proximal and distal ends, a reflective inner surface defining a hollow interior and a cross section defining a polygon;
    providing a coupler mechanically coupled to the wave guide and adapted to mechanically couple to a source optical fiber generally adjacent the proximal end to thereby optically couple the source optical fiber to the proximal end, the coupler further adapted to mechanically couple to a plurality of optical fibers generally adjacent the distal end to thereby optically couple the plurality of fibers to the distal end;
    coupling the electromagnetic wave to the wave guide proximal end with the coupler such that the wave passes through the wave guide in a direction generally perpendicular to the cross section and is reflected toward a center of the tube as the waves travels through the hollow interior of the body from the wave guide proximal end to the wave guide distal end; and coupling the wave to at least one destination at the distal end with the coupler after the wave passes through the wave guide.

12. The method according to claim 11, further comprising aligning the wave guide with a source of the created wave to within as much as 2 degrees.

13. The method according to claim 11, further comprising aligning the wave guide and the at least one destination to within as much as 10 degrees.

14. The method according to claim 11, wherein the polygon is a hexagon.

15. The method according to claim 11, the creating further comprising using an optical fiber.

16. The method according to claim 11, the creating further comprising using a light source generally adjacent the wave guide.

17. The method according to claim 11, further comprising bundling a plurality of optical fibers, each optical fiber of the bundle to be routed to at least one of the destinations.

18. The method according to claim 11, further comprising defining a cross section of the bundle to generally correspond to the cross section of the wave guide.

19. The method according to claim 11, further comprising the passing being for a distance of at least about 6 times a width of the wave guide.

* * * * *